T. G. BRIGGS.
WHEEL.
APPLICATION FILED MAY 19, 1911.
1,034,414.
Patented Aug. 6, 1912.
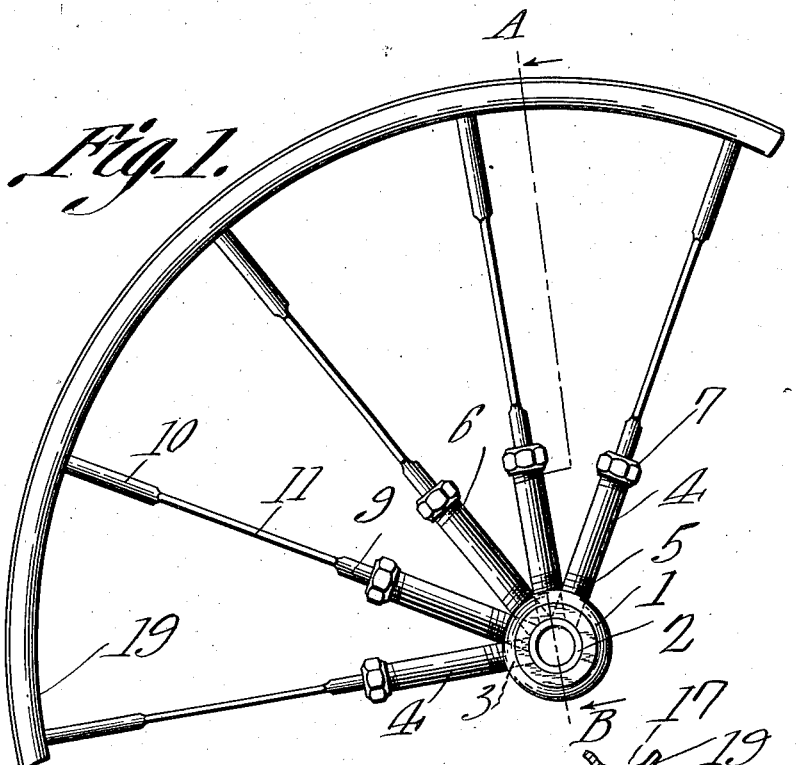
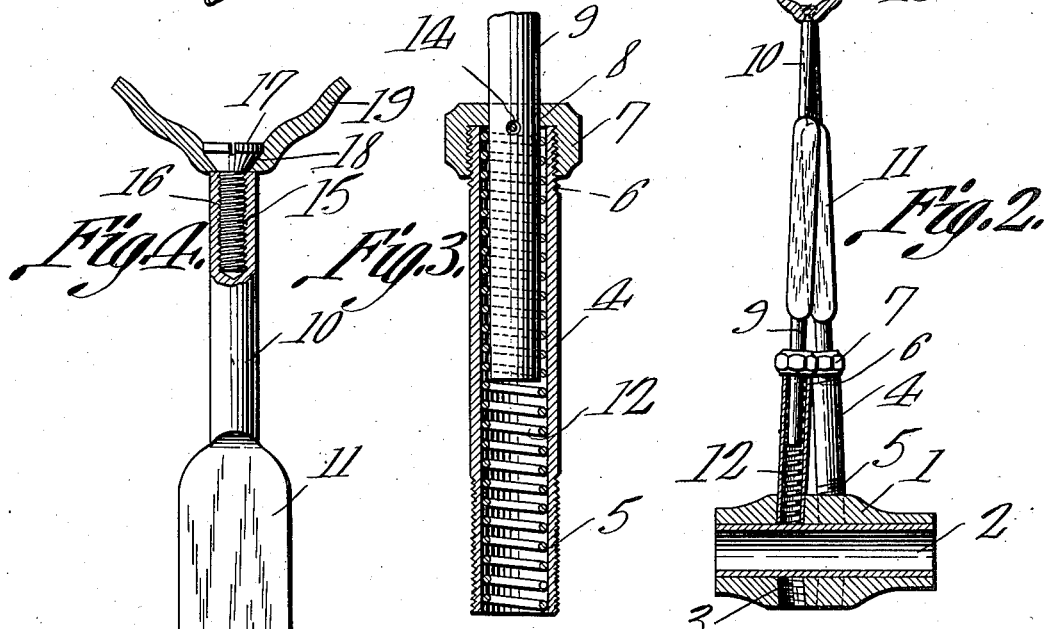

UNITED STATES PATENT OFFICE.

THOMAS G. BRIGGS, OF LEXINGTON, NORTH CAROLINA.

WHEEL.

1,034,414.

Specification of Letters Patent.

Patented Aug. 6, 1912.

Application filed May 19, 1911. Serial No. 628,311.

*To all whom it may concern:*

Be it known that I, THOMAS G. BRIGGS, a citizen of the United States, residing at Lexington, in the county of Davidson and State of North Carolina, have invented a new and useful Wheel, of which the following is a specification.

The primary object of the present invention is to provide a wheel so constructed that the desired degree of resiliency will be obtained, without resort to pneumatic or spring tires; although, when desired, such tires may be employed in connection with the device herein disclosed.

A further object of the invention is to provide a resilient spoke of novel and improved form, and to provide novel means whereby the spoke is connected with the hub of the wheel, and with the rim thereof.

With the foregoing and other objects in view which will appear as the description proceeds, the invention resides in the combination and arrangement of parts and in the details of construction hereinafter described and claimed, it being understood that changes in the precise embodiment of invention herein disclosed can be made within the scope of what is claimed without departing from the spirit of the invention.

In the accompanying drawings,—Figure 1 shows the invention in fragmental side elevation; Fig. 2 is a transverse section on the line A—B of Fig. 1; and Figs. 3 and 4 are sectional details enlarged from Fig. 2.

In carrying out the invention there is provided a hub 1, within which is located a tubular bearing 2. In the outer face of the hub 1, are fashioned a plurality of radial openings 3, internally threaded as clearly shown in Fig. 2. The openings 3 are located, alternately, upon opposite sides of the median plane of the wheel, and the openings are inclined toward each other, at their outer ends, so that the inner ends of the spokes will be spaced apart, transversely of the wheel, while the outer ends of the spokes, adjacent the rim, will lie in a common plane, as shown in Fig. 2.

A plurality of tubular sockets 4 are provided, the sockets being threaded at their inner ends, as denoted by the numeral 5, to coöperate with the threaded openings 3 in the hub 1. When the sockets 4 are rotated to place in the hub 1, the inner ends of the sockets 4 will bear against the tubular bearing 2, and constitute a means for holding the bearing 2 in place. Adjacent their outer ends the sockets 4 are threaded, as shown at 6, to receive threaded caps 7. In the end walls of the caps 7 there are openings 8, which openings are of less diameter than the internal diameter of the sockets 4.

The invention further includes a plurality of spokes, which may be fashioned from any desired material. The spokes include an inner shank 9 and an outer shank 10, connected by a flattened, spring portion 11, the shanks 9 and 10 being preferably, although not necessarily, circular in cross section. The inner shank 9 is of sufficient diameter to fit closely, yet slidably, in the opening 8 in the cap 7, so that the cap 7 will constitute a guide for the shank 9 of the spoke, when the spoke reciprocates longitudinally of the socket 4.

Located within the socket 4 is a helical spring 12. The inner end of the helical spring 12 abuts against the bearing 2, while the outer end of the spring is engaged through a transverse opening 14 in the shank 9 of the spoke. The material from which the spring is fashioned, is of sufficient diameter to fill the space between the shank 9 of the spoke and the inner wall of the socket 4, so that the spring will constitute a bearing for the inner end of the shank 9 of the spoke, when the same reciprocates in the socket 4.

In the outer end face of the outer shank 10 of the spoke there is a threaded opening 15, adapted to receive a screw 16, having a beveled head 17, adapted to register in a similarly shaped opening 18 in the rim 19, the outer end face of the head 17 of the screw seating flush with the rim 19, as clearly shown in Fig. 4.

In practical operation, the spokes reciprocate longitudinally in the sockets 4, the spokes being thrust outwardly, by the action of the springs 12. In order to permit the shanks 9 of the spokes to move inwardly, into the sockets 4, the spokes must yield, owing to the fact that the sockets 4 are angularly disposed with respect to each other. One of the functions of the spring portions 11 of the spokes, is to permit this necessary yielding of the spokes. Moreover, when each spoke is disposed in a horizontal position, or in a position substantially horizontal, it is obvious that the springs 12 will be subjected to practically no compression. Under such circumstances, the spring portions 11 of the spokes will yield, thus giving the required resiliency to the structure.

In order to secure a proper action of the spring portions 11, it is requisite that the spokes be secured rigidly to the rim 9, and such a rigid connection, is afforded by the engagement between the screws 16, the rim 19, and the outer shanks 10 of the spokes.

The hub preferably, although not necessarily, is fashioned from wood, while the bearing 2, is fashioned from metal. The springs 12 at their inner ends, bear directly against the member 2, and thus a firm abutment for the springs is provided, none of the thrust of the springs, nor the wear incident thereto, being carried by the hub-proper 1.

Having thus described the invention, what is claimed is:—

In a wheel, a hub; a tubular bearing in the hub and adapted to engage directly with an axle to serve as a rotatable mounting for the wheel; a tubular socket threaded into the hub and engaging the bearing to hold the bearing in the hub; a rim; a spoke projecting from the rim and entering the socket; and spring means in the socket and abutting against the bearing, for supporting the spoke.

In testimony that I claim the foregoing as my own, I have hereto affixed my signature in the presence of two witnesses.

THOMAS G. BRIGGS.

Witnesses:
F. B. OCHSENREITER,
MARIE E. GEIER.